(12) United States Patent
Poncelet et al.

(10) Patent No.: US 7,981,322 B2
(45) Date of Patent: *Jul. 19, 2011

(54) USE OF A METAL ORGANOSILICATE POLYMER FOR THE PROTECTION OF COMPOUNDS SENSITIVE TO OXIDATION AND/OR TO ELECTROMAGNETIC RADIATION

(75) Inventors: Olivier Poncelet, Grenoble (FR); Olivier Raccurt, Chelieu (FR); Olivier Renard, Fontanil-Cornillon (FR); Jorice Samuel, Annecy (FR)

(73) Assignee: Commissariat a l'Energie Atomique (FR)

( * ) Notice: Subject to any disclaimer, the term of this patent is extended or adjusted under 35 U.S.C. 154(b) by 158 days.

This patent is subject to a terminal disclaimer.

(21) Appl. No.: 12/329,170

(22) Filed: Dec. 5, 2008

(65) Prior Publication Data
US 2009/0159859 A1 Jun. 25, 2009

(30) Foreign Application Priority Data

Dec. 19, 2007 (FR) .................................. 07 08903

(51) Int. Cl.
C23F 11/12 (2006.01)
C23F 11/18 (2006.01)
B05D 7/00 (2006.01)

(52) U.S. Cl. ......... 252/389.32; 252/389.31; 252/389.52; 252/400.31; 252/589; 252/301.35; 427/212; 427/220; 524/588; 524/91

(58) Field of Classification Search ............. 252/389.32, 252/389.31, 389.52, 400.31, 589, 301.35; 427/212, 220; 524/588, 91
See application file for complete search history.

(56) References Cited

U.S. PATENT DOCUMENTS

| 4,209,555 | A | | 6/1980 | Stewart | |
|---|---|---|---|---|---|
| 5,888,711 | A | * | 3/1999 | Poncelet et al. | 430/527 |
| 5,910,400 | A | * | 6/1999 | Poncelet et al. | 430/529 |
| 6,179,898 | B1 | * | 1/2001 | Poncelet et al. | 75/713 |
| 6,440,308 | B1 | * | 8/2002 | Poncelet et al. | 210/638 |
| 7,354,650 | B2 | * | 4/2008 | Nakajima et al. | 428/446 |
| 2004/0137238 | A1 | * | 7/2004 | Clerici et al. | 428/446 |
| 2005/0238559 | A1 | * | 10/2005 | Poncelet et al. | 423/328.1 |
| 2006/0045833 | A1 | * | 3/2006 | Poncelet et al. | 423/328.1 |
| 2009/0209684 | A1 | * | 8/2009 | Poncelet et al. | 524/91 |

FOREIGN PATENT DOCUMENTS
WO    WO 02/46345    6/2002

OTHER PUBLICATIONS

CAS reg. No. 940935-38-6, Jul. 3, 2007.*
CAS reg. No. 1161745-73-8, Jul. 9, 2009.*
CAS reg. No. 1161745-74-9, Jul. 9, 2009.*
CAS reg. No. 1161745-75-0, Jul. 9, 2009.*
CAS reg. No. 1161745-76-1, Jul. 9, 2009.*
CAS reg. No. 2440-22-4, Nov. 16, 1984.*
International Search Report from corresponding foreign priority French Application No. 07 08903, filed Dec. 19, 2007.
Whilton N T et al.: "Hybrid lamellar nancomposites based on organically functionalized magnesium phyllosilicate clays with interlayer activity"; Jan. 1, 1998, Journal of Materials Chemistry; The Royal Society of Chemistry; Cambridge, GB; pp. 1927-1932; XP002165899.
Avinash J Patil et al: "Synthesis of self-assembly of organoclay-wrapped biomolecules"; Jan. 1, 2004; Angewandte Chemie; International Edition, Wiley VCH Verlag, Weinheim; pp. 4928-4933; XP002477775.

* cited by examiner

*Primary Examiner* — Douglas Mc Ginty
(74) *Attorney, Agent, or Firm* — Alston & Bird LLP

(57) ABSTRACT

In the invention, use is made of at least one metal organosilicate polymer, in the form of particles, having one of the following formulae I and II:

$$R_4Si_4Al_2O_8(OH)_x, \quad \text{Formula I:}$$

$$R_8Si_8M_6O_{16}(OH)_y, \quad \text{Formula II:}$$

for the protection from oxidation and/or electromagnetic radiation of a compound sensitive to oxidation and/or to electromagnetic radiation. The invention finds application in particular in the field of the protection from oxidation and photoaging of various materials.

10 Claims, No Drawings

US 7,981,322 B2

USE OF A METAL ORGANOSILICATE POLYMER FOR THE PROTECTION OF COMPOUNDS SENSITIVE TO OXIDATION AND/OR TO ELECTROMAGNETIC RADIATION

CROSS REFERENCE TO RELATED APPLICATIONS

This application claims priority from French Application No. 07 08903, filed Dec. 19, 2007.

FIELD AND BACKGROUND OF THE INVENTION

The invention relates to the use of a metal organosilicate polymer for the protection, from oxidation and/or electromagnetic radiation, of compounds sensitive to oxidation and/or to electromagnetic radiation.

It also relates to a fluorescent composition and to a marking composition comprising such a fluorescent composition and also to a composition for protecting from electromagnetic radiation.

Numerous compounds have properties which deteriorate by oxidation or by exposure to electromagnetic radiation, in particular during exposure to UV radiation.

This is thus the case with compounds of the family of the benzotriazoles and in particular 2-(2'-hydroxy-5'-methylphenyl)benzotriazole.

Indeed, this compound is an excellent protector from UV radiation because, under irradiation by UV radiation, the hydrogen bond conferring its aromaticity on it is broken and thus the compound absorbs UV photons. As, furthermore, the hydrogen bond is reformed over time, it is a compound absorbing UV photons which is regenerated.

However, this compound is very sensitive to oxidation and is decomposed and thus loses its properties of protecting from UV radiation.

Other compounds sensitive to oxidation and/or to electromagnetic radiation are fluorophoric compounds.

Fluorophoric compounds are used in particular for the marking of paper and textiles, either for combating counterfeiting or for the purposes of authentification or for simply identifying the date of manufacture of the paper or fabric, or also for identifying the manufacturer.

Paper, in particular for a notarial deed, and also textiles have a very long lifetime, of greater than fifteen years.

This is why the resistance to oxidation and to photoaging of the markers used is important.

Rare earths which are inorganic fluorophoric compounds have been used for this purpose of marking.

However, rare earths are easily identified by a simple analysis, which means that marking obtained with rare earths can be easily reproduced.

Organic fluorophoric compounds for their part are not easily identifiable by a simple analysis.

These organic fluorophoric compounds are also used for the biological labeling of biological reactions.

However, these compounds are sensitive to oxidation by oxygen, ozone and NOx, in particular.

They have thus been used in the presence of antioxidants, the aim of which is to scavenge the oxygen in all its forms.

However, the effectiveness of the antioxidant ceases when all the oxygen-scavenging molecules have been consumed by the oxygen molecules present.

Furthermore, and this is a disadvantage in particular for paper and textiles, organic fluorophoric compounds have another disadvantage: they are very sensitive to electromagnetic radiation, such as UV radiation, visible radiation and near infrared radiation.

Currently, in order to protect them, use is made of organic or inorganic additives which will screen out electromagnetic radiation but which will also limit the phenomenon of fluorescence.

However, finally, it is also known that the phenomena of oxidation or of photooxidation and aging by exposure to electromagnetic radiation are superimposed on one another and/or act synergistically to decompose the organic fluorophoric compounds, whether in solution or on various supports.

Furthermore, a family of compounds referred to indiscriminately as metal organosilicate, metal phyllosilicate clay, metal organosilicate polymer or polysilsesquioxane salt is known.

For example, U.S. Pat. No. 7,132,165 B2 describes the manufacture of compounds of this type from amine surfactants or from structuring agents. These compounds are described as being mesoporous compounds based on lamellar silica having a high thermal and hydrothermal stability.

These compounds are also described by L. Ukrainczyk et al. in "Template Synthesis and Characterization of Layered Al- and Mg-Silsesquioxanes", *J. Phys. Chem. B,* 1997, 101, 531-539.

A method for the preparation of these compounds is described in this document: the silsesquioxane compounds were prepared by precipitation at ambient temperature by addition of an aqueous base to an alcoholic solution comprising a mixture of $AlCl_3$ or of $MgCl_2$ and of a trialkoxysilane with an n-dodecyl, n-octyl, n-pentyl, 3-methacryloyloxypropyl, isobutyl or phenyl functionality.

These compounds are described as being able to be used as absorbents, environmental barriers, polymer fillers, catalytic supports or chemical sensors.

Nicola T. Whilton et al., in "Hybrid lamellar nanocomposites based on organically functionalized magnesium phyllosilicate clays with interlayer reactivity", *J. Mater. Chem.,* 1998, 8(8), 1927-1932, also describe the preparation of such compounds by addition of organotrialkoxysilane to a solution of $MgCl_2.6H_2O$ in ethanol and precipitation by a sodium hydroxide solution.

However, no application is described or suggested in this document for these compounds.

U.S. Pat. No. 5,342,876 also describes a process for producing such compounds, which are described as being spherical and porous silica granules which have an excellent ability to disperse in resins and thus make it possible to obtain films having an excellent transparency, which are resistant to flaking and which can be used as odor scavengers and as agent for controlling exudation.

SUMMARY OF THE INVENTION

The aim of the invention is to overcome the sensitivity to oxidation and/or to decomposition by any electromagnetic radiation and in particular UV radiation of compounds sensitive to oxidation and/or to decomposition by electromagnetic radiation.

In particular, the aim of the invention is to overcome the disadvantages of organic fluorophores and to provide a fluorescent composition which is resistant to oxidation and/or to decomposition by any electromagnetic radiation and in particular UV radiation, while not being easily identifiable by simple analysis.

However, another aim of the invention is to provide a composition for protecting from UV radiation which is self-regenerated and which is not decomposed by oxidation over time.

To this end, the invention provides for the use of at least one metal organosilicate polymer, in the form of particles, having one of the following formulae I and II:

$$R_4Si_4Al_2O_8(OH)_x, \quad \text{Formula I:}$$

$$R_8Si_8M_6O_{16}(OH)_y, \quad \text{Formula II:}$$

in which:
each R is chosen, independently of the others, from the group formed by a substituted or unsubstituted and linear or branched alkyl group, a substituted or unsubstituted and linear or branched alkenyl group, a substituted or unsubstituted aryl group and a substituted or unsubstituted benzyl group,
$x \geq 2$,
$y \geq 4$,
in formula I, the Si/Al ratio is between 1.8 and 1.3 inclusive,
in formula II, M is chosen from the group formed by calcium, magnesium, zinc, strontium and the mixtures of these, and the Si/M molar ratio is between 1.8 and 1.3 inclusive,
for the protection from oxidation and/or electromagnetic radiation of a compound sensitive to oxidation and/or to electromagnetic radiation.

Preferably, each R is chosen, independently of the others, from a substituted or unsubstituted methyl group, a substituted or unsubstituted ethyl group, a substituted or unsubstituted n-propyl group and a substituted or unsubstituted benzyl group.

When R is substituted, it is preferably substituted by at least one amino group, one halogen atom, one ether group, one ester group, one hydroxyl group, one acrylate group, one epoxy group, one alkyl group, one alkyl acrylate group, one aminoalkyl group or one chloroalkyl group.

In a preferred embodiment, the metal organosilicate polymer has the formula II in which M is zinc or magnesium and each R is a 3-aminopropyl group.

In another preferred embodiment, the metal organosilicate polymer has the formula II in which M is zinc or magnesium and each R is an $NH_2(CH_2)_2NH(CH_2)_3$ group.

In a first alternative form of the use of the invention, the compound sensitive to oxidation and/or to electromagnetic radiation is an organic fluorophoric compound.

In this case, the organic fluorophoric compound is preferably chosen from the group formed by rhodamine, fluorescein, porphyrins and their mixtures.

In a second alternative form of the use of the invention, the compound sensitive to oxidation and/or to electromagnetic radiation is a benzotriazole compound.

More preferably, this benzotriazole compound is 2-(2'-hydroxy-5'-methylphenyl)benzotriazole and the metal organosilicate polymer has the formula II in which M is zinc (Zn) and four R groups are $NH_2(CH_2)_3$ groups and four R groups are $C_6H_5$ groups.

The invention also provides a fluorescent composition, which comprises:
particles of at least one organic fluorophoric compound, and
particles of at least one metal organosilicate polymer compound having one of the following formulae I and II:

$$R_4Si_4Al_2O_8(OH)_x, \quad \text{Formula I:}$$

$$R_8Si_8M_6O_{16}(OH)_y, \quad \text{Formula II:}$$

in which:
each R is chosen, independently of the others, from the group formed by a substituted or unsubstituted and linear or branched alkyl group, a substituted or unsubstituted and linear or branched alkenyl group, a substituted or unsubstituted aryl group and a substituted or unsubstituted benzyl group,
$x \geq 2$,
$y \geq 4$,
in the formula I, the Si/Al ratio is between 1.8 and 1.3 inclusive,
in the formula II, M is chosen from the group formed by calcium, magnesium, zinc, strontium and the mixtures of these, and the Si/M molar ratio is between 1.8 and 1.3 inclusive.

Preferably, in the fluorescent composition according to the invention, the organic fluorophoric compound is chosen from the group formed by rhodamine, fluorescein, porphyrins and their mixtures.

As to each R group, it is chosen, independently of the others, from a substituted or unsubstituted methyl group, a substituted or unsubstituted ethyl group, a substituted or unsubstituted n-propyl group and a substituted or unsubstituted benzyl group.

When R is substituted, it is preferably substituted by at least one amino group, one halogen atom, one ether group, one ester group, one hydroxyl group, one acrylate group, one epoxy group, one alkyl group, one alkyl acrylate group, one aminoalkyl group or one chloroalkyl group.

Preferably, in the fluorescent composition of the invention, the metal organosilicate polymer has the formula II in which M is magnesium or zinc and each R is a 3-aminopropyl group.

In another alternative form of the fluorescent composition of the invention, the metal organosilicate polymer has the formula II in which M is magnesium or zinc and each R is an $NH_2(CH_2)_2NH(CH_2)_3$ group.

In a preferred embodiment, the fluorescent composition according to the invention is in the form of solid particles.

However, in another preferred embodiment according to the invention, the fluorescent composition of the invention is in the form of a dispersion or of a colloidal sol, preferably in an aqueous phase.

The invention also provides a marking composition, which comprises at least one fluorescent composition according to the invention.

However, the invention also provides a composition for protecting from UV radiation, which comprises:
2-(2'-hydroxy-5-'-methylphenyl)benzotriazole and
particles of at least one metal organosilicate polymer having one of the following formulae I and II:

$$R_4Si_4Al_2O_8(OH)_x, \quad \text{Formula I:}$$

$$R_8Si_8M_6O_{16}(OH)_y, \quad \text{Formula II:}$$

in which:
each R is chosen, independently of the others, from the group formed by a substituted or unsubstituted and linear or branched alkyl group, a substituted or unsubstituted and linear or branched alkenyl group, a substituted or unsubstituted aryl group and a substituted or unsubstituted benzyl group,
$x \geq 2$,
$y \geq 4$,
in the formula I, the Si/Al ratio is between 1.8 and 1.3 inclusive,
in the formula II, M is chosen from the group formed by calcium, magnesium, zinc, strontium and the mixtures of these, and the Si/M molar ratio is between 1.8 and 1.3 inclusive.

In the composition for protecting from UV radiation according to the invention, each R is preferably chosen, independently of the others, from a substituted or unsubstituted methyl group, a substituted or unsubstituted ethyl group, a substituted or unsubstituted n-propyl group and a substituted or unsubstituted benzyl group.

When R is substituted, it is preferably substituted by at least one amino group, one halogen atom, one ether group, one ester group, one hydroxyl group, one acrylate group, one epoxy group, one alkyl group, one alkyl acrylate group, one aminoalkyl group or one chloroalkyl group.

A composition for protecting from UV radiation according to the invention which is particularly preferred is a composition in which the metal organosilicate polymer has the formula II in which M is zinc (Zn) and four R groups are $NH_2(CH_2)_2NH(CH_2)_3$ groups and four R groups are $C_6H_5$ groups.

A better understanding of the invention will be achieved and other characteristics and advantages of the invention will become more clearly apparent on reading the explanatory description which follows.

The invention is based on the discovery that particles of a metal organosilicate polymer having one of the following formulae I and II:

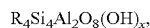  Formula I:

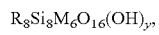  Formula II:

have properties of protecting, from oxidation and/or electromagnetic radiation, in particular UV radiation, compounds sensitive to this oxidation and/or to this radiation.

The formulae I and II represent compounds of the metal aluminosilicate or silicate type having organic substituents. These compounds have water contents which can vary as they are highly hygroscopic. This is why, in the formulae I and II, the stoichiometry of OH⁻ ions is indicated by the variables x and y.

However, in formula I, in order to adhere to the stoichiometry of this formula, x must be equal at least to 2 and, in the formula II, y must be equal at least to 4.

However, in these compounds, the Si/Al molar ratio in the formula I or the Si/M ratio in the formula II is fully defined. This molar ratio has to be between 1.8 and 1.3 inclusive.

The particles of the metal organosilicate polymer have a size of approximately 100 nm.

The particles of the metal organosilicate polymer having the formula I or the formula II above are formed by controlled cohydrolysis methods comprising the treatment of one or more magnesium, zinc, calcium, strontium or aluminum salts and of a mixture of silane coupling agents of formula $R_xSi(OR^1)_{4-x}$, in which x has a value between 1 and 2 inclusive and $R^1$ is a hydrolysable group, with an alkaline alcoholic solution.

In some embodiments, the R functional groups of the silane coupling agents include a basic group, such as an amino group, and it is then unnecessary to add an alkaline alcoholic solution, although a small amount of base may be necessary in order for the desired stoichiometric equivalence amount of base to be present. The metal (one or more of magnesium, zinc, calcium and strontium) Si or Al/Si molar ratio is preferably maintained between 1 and 0.5 inclusive and the alkali metal molar ratio is preferably maintained between 1 and 0.5 inclusive.

Preferably, an alcoholic solution of sodium hydroxide, of potassium hydroxide, of lithium hydroxide, of diethylamine or of triethylamine having a concentration between 0.5M and 5M inclusive, preferably of approximately 3M, is used.

Preferably, the alkoxy groups of the silane coupling agent ($OR^1$) are propoxy, ethoxy or methoxy groups.

With regard to each R group present in the silane coupling agent, it is chosen, independently of the others, from the group formed by a substituted or unsubstituted alkyl group comprising a linear or branched chain, a substituted or unsubstituted and linear or branched alkenyl group, a substituted or unsubstituted aryl group or a substituted or unsubstituted benzyl group.

Most preferably, each R is, independently of the others, a substituted or unsubstituted alkyl or alkenyl group, each linear or branched, or a substituted or unsubstituted benzyl group.

Most preferably, each R is, independently of the others, a $C_1$ to $C_{12}$, more preferably $C_2$ to $C_8$, alkyl or alkenyl group or a benzyl group, each of these groups being substituted or unsubstituted.

Most preferably, each R is, independently of the others, a methyl group, an ethyl group, an n-propyl group, an n-butyl group, a vinyl group or a benzyl group, it being possible for each of these groups to be substituted or unsubstituted.

The appropriate substituent groups of the R group and especially of the linear or branched alkyl and alkenyl groups can be any appropriate substituent for affecting the desired properties of hydrophilicity or hydrophobicity.

For example, each R group can be substituted with a basic group, such as an amino group, including the diamino and triamino substituents, a halogen atom, such as one or more fluorine, chlorine, bromine or iodine atoms but preferably a chlorine atom, an ether group, an ester group, a hydroxyl group, an acrylate group, such as a methacrylate group, or any other leaving group or any other reactive group which will make possible additional modifications, such as an epoxy group or an aryl group, both optionally substituted.

Most preferably, the substituent of the R group is an alkyl group, an alkyl acrylate group, an aminoalkyl group, a chloroalkyl group or a vinyl group, especially a methyl group, an ethyl group, an n-propyl group, an n-butyl group, a propyl methacrylate group, a 3-chloropropyl group or a 3-aminopropyl group.

Most preferably, R is a (3-aminopropyl)aminoethyl group.

With regard to the mixed metal salt used, it can be one or more of a magnesium, strontium, calcium, zinc or aluminum salt in order to form a metal organosilicate polymer compound in which the metal/silicon or aluminum/silicon molar ratio is between 1.8 and 1.3 inclusive.

The metal is most preferably magnesium or zinc.

The metal salts which are particularly preferred are the chloride salts and in particular, when the metal is magnesium, magnesium chloride hexahydrate.

The cohydrolysis, reaction described above gives metal organosilicate polymer compounds used in the invention, in the form of particles, having one of the following formulae I and II:

  Formula I:

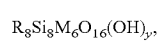  Formula II:

in which:

each R is chosen, independently of the others, from the group formed by a substituted or unsubstituted and linear or branched alkyl group, a substituted or unsubstituted and linear or branched alkenyl group, a substituted or unsubstituted aryl group and a substituted or unsubstituted benzyl group, $x \geq 2$, $y \geq 4$, in the formula I, the Si/Al ratio is between 1.8 and 1.3 inclusive, in the formula II, M is chosen from the group formed by calcium, magnesium, zinc, strontium and the mixtures of these, and the Si/M molar ratio is between 1.8 and 1.3 inclusive.

The preferred metal organosilicate polymer compounds used in the invention are compounds having the formula II in which each R is an N-(2-aminoethyl)-3-propylamine or $NH_2(CH_2)_2NH(CH_2)_3$ group and the metal is Mg or Zn.

The addition of nanoparticles of the metal organosilicate polymer compounds of formula I and of formula II which are defined above makes it possible to stabilize organic fluorophoric compounds, such as rhodamine, fluorescein and porphyrins, with regard to oxidation, in particular in aqueous dispersion.

In order to obtain this stabilization, it is sufficient to add the nanoparticles of at least one metal organosilicate polymer compound described above to the organic fluorophoric compound.

Preferably, the weight of metal organosilicate polymer compound/weight of organic fluorophoric compound ratio is greater than or equal to 0.33. This is because, below this ratio, the stabilization to oxidation and/or to electromagnetic radiation is less effective.

The maximum ratio will be determined by a person skilled in the art.

This is because the particles of metal organosilicate polymer compounds are transparent and very small, of the order of 10 to 100 nm. It is possible to put in a large amount of them without affecting the optical properties of the organic fluorophoric compound.

However, for textile applications, the feel may be affected, so that, in this case, the weight of metal organosilicate polymer compound/weight of organic fluorophoric compound ratio is preferably kept below or equal to 1.33 as subsequently the fabric may become rough.

However, the addition of nanoparticles of the metal organosilicate polymer compounds of formula I or of formula II according to the invention also makes it possible to stabilize, with regard to oxidation, in particular in solution, compounds which have properties of protecting from UV radiation and which are very sensitive to oxidation, in particular those of the family of the benzotriazoles and more particularly 2-(2'-hydroxy-5'-methylphenyl)benzotriazole.

In this case, a preferred metal organosilicate polymer is the polymer having the formula II in which M is zinc (Zn) and four R groups are $NH_2(CH_2)_2NH(CH_2)_3$ groups and four R groups are $C_6H_5$ groups.

In order to give a better understanding of the invention, several embodiments thereof will now be described, as illustrative and nonlimiting examples.

EXAMPLE 1

Synthesis of the Metal Organosilicate Polymer Compound of Formula II in which M is Magnesium and R is a 3-Amino-Propyl Group 1.2 mol of $MgCl_2 \cdot 6H_2O$ are dissolved in 2900 g of ethanol, and 312 g of (3-aminopropyl)triethoxysilane are rapidly added. A white precipitate is rapidly formed and the reaction medium is stirred at ambient temperature for 24 h. After filtration, the white precipitate is washed with 2000 g of ethanol. The white powder obtained is dried at ambient temperature for two days. The yield, calculated with regard to the magnesium, is 48%. The Mg/Si molar ratio, measured by ICP-AES (Inductively Coupled Plasma-Atomic Emission Spectrophotometry), is 0.6. X-ray diffraction shows that the product is weakly crystalline. The metal organosilicate polymer compound obtained is completely dispersible in water and it can be washed by dialysis or by nano- and/or ultrafiltration. The size of the particles, measured by photon correlation spectroscopy, lies between 20 and 30 nm.

EXAMPLE 2

Synthesis of the Metal Organosilicate Polymer of Formula II in which M is Zn and R is a 3-Aminopropyl Group 1.2 mol of $ZnCl_2 \cdot 6H_2O$ are dissolved in 2900 g of ethanol, and 312 g of (3-aminopropyl)triethoxysilane are rapidly added. A white precipitate is rapidly formed and the reaction medium is stirred at ambient temperature for 24 h. After filtration, the white precipitate is washed with 2000 g of ethanol. The white powder obtained is dried at ambient temperature for two days. The yield, calculated with regard to the zinc, is 49%. The Zn/Si molar ratio, measured by ICP-AES (Inductively Coupled Plasma-Atomic Emission Spectrophotometry), is 0.57. X-ray diffraction shows that the product is weakly crystalline. The metal organosilicate polymer compound obtained is completely dispersible in water and it can be washed by dialysis or by nano- and/or ultrafiltration. The size of the particles, measured by photon correlation spectroscopy, lies between 20 and 30 nm.

EXAMPLE 3

Synthesis of the Metal Organosilicate Polymer Compound of Formula II in which M is Mg and R is an N-(2-Aminoethyl)-3-Propylamine or $NH_2(CH_2)_2NH(CH_2)_3$ Group 0.2 mol of $MgCl_2 \cdot 6H_2O$ is dissolved in 500 g of ethanol and then 0.2 mol of N-[3-(trimethoxysilyl)propyl]ethylenediamine is rapidly added. A white precipitate is rapidly formed and the reaction medium is stirred at ambient temperature for 24 h. After filtration, the white precipitate is washed with 500 g of ethanol. The white powder obtained is dried at ambient temperature for two days. The yield, calculated with regard to the magnesium, is 48%. The Mg/Si molar ratio, measured by ICP-AES (Inductively Coupled Plasma-Atomic Emission Spectrophotometry), is 0.58. X-ray diffraction shows that the product is weakly crystalline. The metal organosilicate polymer compound obtained is completely dispersible in water and it can be washed by dialysis or by nano- and/or ultrafiltration. The size of the particles, measured by photon correlation spectroscopy, lies between 20 and 40 nm.

EXAMPLE 4

Synthesis of the Metal Organosilicate Polymer Compound of Formula II in which R is N-(2-Aminoethyl)-3-Propylamine or $NH_2(CH_2)_2NH(CH_2)_3$ and M is Zn 0.2 mol of $ZnCl_2 \cdot 6H_2O$ is dissolved in 500 g of ethanol, and 0.2 mol of N-[3-(trimethoxysilyl)propyl]ethylenediamine is rapidly added. A white precipitate is rapidly formed and the reaction medium is stirred at ambient temperature for 24 h. After filtration, the white precipitate is washed with 500 g of ethanol. The white powder obtained is dried at ambient temperature for two days. The yield, calculated with regard to the zinc, is 43%. The Zn/Si molar ratio, measured by ICP-AES (Inductively Coupled Plasma-Atomic Emission Spectrophotometry), is 0.57. X-ray diffraction shows that the product is weakly crystalline. The metal organosilicate polymer compound obtained is completely dispersible in water and it can be washed by dialysis or by nano- and/or ultrafiltration. The size of the particles, measured by photon correlation spectroscopy, lies between 15 and 30 nm.

EXAMPLE 5

Stabilization of Rhodamine 6G from Oxidation and Photooxidation 150 mg of rhodamine 6G are dispersed in 150 ml of osmotically treated water. This dispersion is then divided in three; 5 ml of a solution or dispersion 1, 2 or 3 as defined below are then added to each of the dispersions:

dispersion 1: 5 ml of an aqueous dispersion of the metal organosilicate polymer (10 g/l) obtained in example 1. Dispersion 5A is obtained, solution 2: 5 ml of osmotically treated water. Dispersion 5B is obtained, dispersion 3: 5 ml of an aqueous dispersion of colloidal silica (diameter of 20 nm) Ludox® TM-40 (10 g/l). Dispersion 5C is obtained.

The pH values of the three dispersions are measured; the pH is 8.5 for dispersions 5A and 5C. It is brought to 8.5 for dispersion 5B by addition of NaOH.

The three dispersions are packaged in identical containers leaving a minimum gaseous headspace so as to limit phenomena of oxidation.

The optical densities (O.D.) of the three dispersions are measured on a UV-visible spectrometer:

at packaging, after packaging at ambient temperature with the exclusion of light for 24 h, after exposure to the light of a neon lamp for 12 h, 24 h, 36 h and finally 72 h.

The results are given in the following table 1:

TABLE 1

| Samples | O.D. at packaging | O.D. after 24 h with the exclusion of light | O.D. after 12 h in the light of a neon lamp | O.D. after 24 h in the light of a neon lamp | O.D. after 36 h in the light of a neon lamp | O.D. after 72 h in the light of a neon lamp |
|---|---|---|---|---|---|---|
| Dispersion 5A | 2.4 | 2.2 | 2.0 | 2.0 | 1.9 | 1.8 |
| Dispersion 5B | 2.4 | 1.8 | 1.5 | 1.3 | 1 | 0.4 |
| Dispersion 5C | 2.4 | 1.8 | 1.4 | 1.2 | 0.9 | 0.3 |

Dispersion 5A, which comprises the metal organosilicate polymer, has not changed to a significant extent; the loss in optical density is only 25%, compared with more than 80% for dispersions 5B and 5C. Dispersion 5C shows that it is not sufficient for nanoparticles to be present in order to observe a stabilizing effect on the organic fluorophoric compound since this dispersion also comprises nanoparticles with a diameter of 20 nm.

These results also show that, even if care was taken to limit the phenomena of oxidation by limiting the gaseous headspace during bottling, there was a loss in optical density despite storage with the exclusion of light, but this loss is very low with the composition of the invention.

The same results are obtained under exposure of dispersions 5A to 5C to a UV lamp with a power of 4 W centered at 365 nm.

EXAMPLE 6

Test of Oxidation in the Air of a Rhodamine 6G Solution 150 mg of rhodamine 6G are dispersed in 150 ml of osmotically treated water. This dispersion is then divided in three; 5 ml of a solution or dispersion 1, 2 or 3 as defined below are then added to each of the dispersions:

dispersion 1: 5 ml of an aqueous dispersion of the metal organosilicate polymer (10 g/l) obtained in example 1. Dispersion 6A is obtained, solution 2: 5 ml of osmotically treated water. Dispersion 6B is obtained, dispersion 3: 5 ml of an aqueous dispersion of colloidal silica (diameter of 20 nm) Ludox® TM-40 (10 g/l). Dispersion 6C is obtained.

The pH values of the three dispersions are measured; the pH is 8.5 for dispersions 6A and 6C. It is brought to 8.5 for dispersion 6B by addition of NaOH.

The three dispersions are packaged in containers with the exclusion of light, into which air is bubbled at ambient temperature with stirring for 4 h. Each of the containers is surmounted by a condenser, so as to minimize evaporation. The optical densities of the three dispersions are measured by UV-visible spectrometry.

The results are given in table 2.

TABLE 2

| Samples | O.D. at packaging | O.D. after 4 h with the exclusion of light while bubbling air through |
|---|---|---|
| Dispersion 6A | 2.3 | 1.7 |
| Dispersion 6B | 2.3 | 0.8 |
| Dispersion 6C | 2.3 | 0.75 |

These results unambiguously show that oxidation contributes to the decoloration of the solutions. Here again, the presence of the metal organosilicate polymer limits this phenomenon.

EXAMPLE 7

Stabilization of Rhodamine 6G in the Form of a Thin Layer 150 mg of rhodamine 6G are dispersed in 150 ml of osmotically treated water. This dispersion is then divided in three; 5 ml of a solution or dispersion 1, 2 or 3 defined below are then added to each of the dispersions:

dispersion 1: 5 ml of an aqueous dispersion of the metal organosilicate polymer (10 g/l) obtained in example 1. Dispersion 7A is obtained, solution 2: 5 ml of osmotically treated water. Dispersion 7B is obtained, dispersion 3: 5 ml of an aqueous dispersion of colloidal silica (diameter of 20 nm) Ludox® TM-40 (10 g/l). Dispersion 7C is obtained.

The pH values of the three dispersions are measured; the pH is 8.5 for dispersions 7A and 7C. It is brought to 8.5 for dispersion 7B by addition of NaOH.

10 ml of an aqueous dispersion of polyvinyl alcohol (4% by weight), degassed beforehand under argon, are added to each of the dispersions. A film of each dispersion is deposited by dip coating on glass slides degreased beforehand. The operation is repeated three times for each of the dispersions.

The optical densities of the deposited layers on the sheets are measured by UV-visible spectrometry. The films obtained are completely transparent. They are exposed at ambient temperature under light for 12 h and 24 h.

The results are given in table 3 below (mean value of optical density).

TABLE 3

| Samples | O.D. at packaging | O.D. after 12 h in the light of a neon lamp | O.D. after 24 h in the light of a neon lamp |
|---|---|---|---|
| Dispersion 7A | 5 | 5 | 4.9 |
| Dispersion 7B | 5.1 | 3 | 1 |
| Dispersion 7C | 5.1 | 3 | 1 |

In the form of a thin layer, the organic fluorophoric compound, which is no longer mobile, remains in contact with the metal organosilicate polymer; the phenomena of oxidation are completely eliminated. In dispersion, there is always an equilibrium between the adsorbed organic fluorophoric compound and the metal organosilicate polymer, and the free organic fluorophoric compound; a portion of the free organic fluorophoric compound can then be oxidized, which explains why, in dispersion, even if the metal organosilicate polymer is highly effective, it does not succeed in halting the oxidation but makes it possible to very markedly slow it down.

EXAMPLE 8

Stabilization of Rhodamine 6G to Oxidation by a Metal Organosilicate Polymer Compound with a Zinc Core The same tests were repeated but with the metal organosilicate polymer obtained in example 2.

150 mg of rhodamine 6G are dispersed in 150 ml of osmotically treated water. This dispersion is then divided in three; 5 ml of a solution or dispersion 1', 2' or 3' defined below are then added to each of the dispersions:

dispersion 1': 7 ml of an aqueous dispersion of the metal organosilicate polymer compound obtained in example 2 (10 g/l). Dispersion 8A is obtained, solution 2': 5 ml of osmotically treated water. Dispersion 8B is obtained, dispersion 3': 5 ml of an aqueous dispersion of colloidal silica (diameter of 20 nm) Ludox® TM-40 (10 g/l). Dispersion 8C is obtained.

The pH values of the three dispersions are measured; the pH is 8.5 for dispersions 8A and 8C. It is brought to 8.5 for dispersion 8B by addition of NaOH.

10 ml of an aqueous solution of polyvinyl alcohol (4% by weight), degassed beforehand under argon, are added to each of the dispersions.

Each of the dispersions obtained with dispersion 8A is diluted twofold by addition of osmotically treated water. A film of each dispersion is then deposited by dip coating on glass slides degreased beforehand. The operation is repeated three times for each of the dispersions.

The optical densities of the deposited layers on the sheets are measured by UV-visible spectrometry. The films obtained are completely transparent. They are exposed at ambient temperature to the light of a neon lamp for 12 h and 24 h.

The results are given in the following table 4 (mean value of optical density).

TABLE 4

| Samples | O.D. at packaging | O.D. after 12 h in the light of a neon lamp | O.D. after 24 h in the light of a neon lamp |
|---|---|---|---|
| Dispersion 8A | 6 | 6 | 5.9 |
| Dispersion 8B | 5.9 | 3.8 | 2 |
| Dispersion 8C | 5.9 | 4.2 | 3 |

It is seen from table 4 that the metal organosilicate polymer obtained in example 2 shows similar properties to those of the metal organosilicate polymer obtained in example 1.

Similar results are obtained with metal organosilicate polymers in which M is magnesium or zinc and the R groups are N-(2-aminoethyl)-3-propylamine or $NH_2(CH_2)_2NH(CH_2)_3$ groups instead of 3-aminopropyl or $NH_2(CH_2)_3$ groups.

50 mg of metal organosilicate polymer are sufficient to stabilize 150 mg of organic fluorophoric compound.

Without wishing to be committed to this theory, it is believed that the stabilization is due to the formation of the self-assembling of some molecules of the fluorophoric compounds on the surface of the metal organosilicate polymer, thus forming a protopigment which is markedly more stable to oxidation and to photooxidation than the fluorophoric compound in the molecular form. Below the metal organosilicate polymer/fluorophoric compound ratio by weight of 0.33, the stabilization is much less effective. As the metal organosilicate polymers are transparent and very small, it is possible to put in a large amount of them without affecting the optical properties. For textile applications, the feel may be affected; the metal organosilicate polymer/fluorophoric compound ratio is preferably less than or equal to 1.33 as, beyond this value, the fabric becomes rough.

Similar results are obtained with the metal organosilicate polymer compounds obtained in examples 3 and 4.

Furthermore, it is possible to neutralize the dispersions of fluorescent composition according to the invention by addition of hydrochloric acid without affecting the stabilization properties.

The same stabilization properties were obtained with fluorescein, although the effect is less noteworthy as this fluorophoric compound appears to be less sensitive to oxidation and to electromagnetic radiation.

Thus, the fluorescent composition of the invention can be used both in the form of a dispersion or of a colloidal sol, in particular in the aqueous phase, and in a solid form.

This characteristic is particularly advantageous, in particular for use as marking composition, either for determining the origin of the product or for determining the date of manufacture of the product, in particular of official papers or of textiles, or also for purposes of anticounterfeiting marking.

Thus, the fluorescent composition of the invention can be used to mark papers or textiles or any other component in the form of barcodes or patterns, or also of combinations of patterns of different colors, in particular by using a fluorescent composition according to the invention comprising fluorescein, a fluorescent composition according to the invention comprising a porphyrin and a composition according to the invention comprising rhodamine and by varying the patterns obtained by virtue of these three compositions.

Thus, the invention also relates to a marking composition comprising at least one fluorescent composition according to the invention as described above.

EXAMPLE 9

Synthesis of the Metal Organosilicate Polymer of Formula II in which M is Zinc (Zn) and Four R Groups are $NH_2(CH_2)_3$ Groups and Four R Groups are $C_6H_5$ Groups 0.0191 mol of $ZnCl_2.6H_2O$ is dissolved in 200 g of ethanol and then an equimolar mixture of (3-aminopropyl)triethoxysilane and phenyltriethoxysilane (0.00955/0.00955) in 20 g of EtOH is rapidly added. The solution rapidly turns opaque and then 0.0095 mol of NaOH in 20 g of EtOH is added. The reaction medium is stirred at ambient temperature for 24 h. After filtration, the white precipitate is washed with 200 g of ethanol. The white powder is dried at ambient temperature for two days. The yield, calculated with regard to the magnesium, is 38%. The Zn/Si molar ratio, measured by ICP-AES (Inductively Coupled Plasma-Atomic Emission Spectrophotometry), is 0.7. X-ray diffraction shows that the product is weakly crystalline. The metal organosilicate polymer obtained is fully dispersible in water and it can be washed by dialysis or by nano- and/or ultrafiltration. The size of the particles, measured by photon correlation spectroscopy, lies between 20 and 50 nm.

EXAMPLE 10

Stabilization of 2-(2'-hydroxy-5'-methylphenyl)benzotriazole 25 ml of an aqueous colloidal sol of the metal organosilicate polymer obtained in example 9 (10 g/l) are stirred at ambient temperature. 200 mg of 2-(2'-hydroxy-5'-methylphenyl)benzotriazole, the latter being entirely insoluble in water, are subsequently added. Dispersion in the colloidal sol is very slow; it is accelerated when the top of the beaker is irradiated with a UV lamp (4W centered at 365 nm).

The dispersion becomes clear and transparent in a few minutes. UV irradiation breaks the hydrogen bond which confers planarity and thus delocalization of the electrons and thereby its absorbance in the UV region on the 2-(2'-hydroxy-5'-methylphenyl)benzotriazole. The latter depolymerizes and is rapidly adsorbed on the metal organosilicate polymer.

In order to measure the stabilization of the 2-(2'-hydroxy-5'-methylphenyl)benzotriazole to oxidation, thin layers with the following compositions are manufactured:

Composition 10A: 5 ml of the 2-(2'-hydroxy-5'-methylphenyl)benzotriazole dispersion obtained above are introduced into a sol-gel formulation made of a 0.1M alcoholic mixture of four molar equivalents of 3-glycidopropyltrimethoxysilane+1 molar equivalent of tetraethyl orthosilicate+5 ml of $H_2O$.

The 5 ml of $H_2O$ of the sol-gel formulation of the 0.1M alcoholic mixture were thus replaced with 5 ml of the 2-(2'-hydroxy-5'-methylphenyl)benzotriazole dispersion obtained in this example.

Composition 10B: 0.5 ml of the 2-(2'-hydroxy-5'-methylphenyl)benzotriazole dispersion obtained in this example is introduced into the same sol-gel formulation of the 0.1M alcoholic mixture as above.

In this case, only 10% of the 5 ml of $H_2O$ of this sol-gel formulation are replaced with the aqueous 2-(2'-hydroxy-5'-methylphenyl)benzotriazole dispersion obtained in this example.

Composition 10C: By way of comparison, a composition comprising 100 mg of 2-(2'-hydroxy-5'-methylphenyl)benzotriazole not stabilized by the metal organosilicate polymer according to the invention diluted in polyvinyl alcohol (4%), THF (25 ml) and water (10 ml) is prepared.

These compositions are deposited on glass slides and dried.

Three thin layers, respectively recorded as 10A, 10B and 10C, are then obtained.

All the layers obtained are completely transparent and homogeneous.

All the layers obtained screen out UV radiation in the region from 280 to 380 nm. The percentage absorbed in the UV range is directly proportional to the amount of 2-(2'-hydroxy-5'-methylphenyl)benzotriazole present.

The transmissions of these thin transparent layers are measured:
at the manufacture thereof,
after 48 hours with the exclusion of light in a fume cupboard (10 m³/h),
after 24 hours under UV irradiation (UV lamp with a power of 4W centered at 365 nm) in the air, and
after 24 hours under UV irradiation (UV lamp with a power of 4W centered at 365 nm) under argon.

The results obtained are given in table 5 below:

TABLE 5

| Samples | % transmission at manufacture | % transmission after 48 hours with the exclusion of light | % transmission after 24 hours of exposure to UV radiation in the air | % transmission after 24 hours of exposure to UV radiation under argon |
|---|---|---|---|---|
| Thin layer 10A | 85% | 85% | 85% | 84% |
| Thin layer 10B | 10% | 10% | 10% | 11% |
| Thin layer 10C | 87% | 65% | 60% | 60% |

These results confirm that the metal organosilicate polymer of the invention stabilizes 2-(2'-hydroxy-5'-methylphenyl)benzotriazole from oxidation.

The tests of example 10 were reproduced using a metal organosilicate polymer obtained according to the process described in example 9 but using 0.191 mol of $MgCl_2.6H_2O$ instead of the 0.0191 mol of $ZnCl_2.6H_2O$.

The results obtained in terms of dispersion and of stabilization to oxidation of 2-(2'-hydroxy-5'-methylphenyl)benzotriazole are identical.

This is to say that the invention is in no way limited just to the stabilization to oxidation and to electromagnetic radiation and in particular to UV radiation of organic fluorophoric compounds or of the members of the family of the benzotriazoles but can be applied to numerous other compounds sensitive to oxidation and/or to electromagnetic radiation.

Thus, it relates to the use of at least one metal organosilicate polymer having one of the following formulae I and II:

  Formula I:

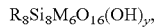  Formula II:

in which:
each R is chosen, independently of the others, from the group formed by a substituted or unsubstituted and linear or branched alkyl group, a substituted or unsubstituted and linear or branched alkenyl group, a substituted or unsubstituted aryl group and a substituted or unsubstituted benzyl group, $x \geq 2$, $y \geq 4$, in the formula I, the Si/Al ratio is between 1.8 and 1.3 inclusive, in the formula II, M is chosen from the group formed by calcium, magnesium, zinc, strontium and the mixtures of these, and the Si/M molar ratio is between 1.8 and 1.3 inclusive, for the protection from oxidation and/or electromagnetic radiation of compounds sensitive to oxidation and/or to electromagnetic radiation.

Preferably, in the formulae I and II, each R is chosen, independently of the others, from a substituted or unsubstituted methyl group, a substituted or unsubstituted ethyl group, a substituted or unsubstituted n-propyl group and a substituted or unsubstituted benzyl group.

When R is substituted, it is preferably substituted by an amino group, a halogen atom, an ether group, an ester group, a hydroxyl group, an acrylate group, an epoxy group, an alkyl group, an alkyl acrylate group, an aminoalkyl group or a chloroalkyl group.

Preferably, the metal organosilicate polymer has the formula II in which M is magnesium or zinc and R is a 3-aminopropyl group.

In another preferred embodiment of the use of the invention, the metal organosilicate polymer has the formula II in which M is magnesium or zinc and each R group is an N-(2-aminoethyl)-3-propylamine or $NH_2(CH_2)_2NH(CH_2)_3$ group.

What is claimed is:

1. A method for the protection from oxidation and/or electromagnetic radiation of a compound sensitive to oxidation and/or to electromagnetic radiation, the method comprising contacting said compound with at least one metal organosilicate polymer compound, in the form of particles, having one of the following formulae I and II:

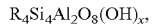  Formula I:

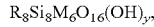  Formula II:

in which:
each R is chosen, independently of the others, from the group formed by a substituted or unsubstituted and linear or branched alkyl group, a substituted or unsubstituted and linear or branched alkenyl group, a substituted or unsubstituted aryl group and a substituted or unsubstituted benzyl group, $x \geq 2$, $y \geq 4$, in the formula I, the Si/Al ratio is between 1.8 and 1.3 inclusive, in the formula II, M is chosen from the group formed by calcium, magnesium, zinc, strontium and the mixtures of these, and the Si/M molar ratio is between 1.8 and 1.3 inclusive, and wherein the compound sensitive to oxidation and/or to electromagnetic radiation is an organic fluorophoric compound or a benzotriazole compound.

2. The method as claimed in claim 1, wherein each R is chosen, independently of the others, from a substituted or unsubstituted methyl group, a substituted or unsubstituted ethyl group, a substituted or unsubstituted n-propyl group and a substituted or unsubstituted benzyl group.

3. The method as claimed in claim 1, wherein, when R is substituted, it is substituted by at least one amino group, one halogen atom, one ether group, one ester group, one hydroxyl group, one acrylate group, one epoxy group, one alkyl group, one alkyl acrylate group, one aminoalkyl group or one chloroalkyl group.

4. The method as claimed in claim 1, wherein the metal organosilicate polymer has the formula II in which M is zinc or magnesium and each R is a 3-aminopropyl group.

5. The method as claimed in claim 1, wherein the metal organosilicate polymer has the formula II in which M is zinc or magnesium and each R is an N-(2-aminoethyl)-3-propylamine group.

6. The method as claimed in claim 1, wherein the compound sensitive to oxidation and/or to electromagnetic radiation is an organic fluorophoric compound.

7. The method as claimed in claim 6, wherein the organic fluorophoric compound is chosen from the group formed by rhodamine, fluorescein, porphyrins and their mixtures.

8. The method as claimed in claim 1, wherein the compound sensitive to oxidation and/or to electromagnetic radiation is a benzotriazole compound.

9. The method as claimed in claim 8, wherein the benzotriazole compound is 2-(2'-hydroxy-5'-methylphenyl)benzotriazole and wherein the metal organosilicate polymer has the formula II in which M is zinc (Zn) and four R groups are $NH_2(CH_2)_3$ groups and four R groups are $C_6H_5$ groups.

10. The method as claimed in claim 1, wherein the particles have a size ranging from 10 to 100 nanometers.

* * * * *